United States Patent
Hwang et al.

(10) Patent No.: US 10,462,771 B2
(45) Date of Patent: Oct. 29, 2019

(54) RECEIVING METHOD AND USER DEVICE IN SMALL-SCALE CELL

(71) Applicant: LG ELECTRONICS INC., Seoul (KR)

(72) Inventors: Daesung Hwang, Seoul (KR); Bonghoe Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/779,531

(22) PCT Filed: Mar. 7, 2014

(86) PCT No.: PCT/KR2014/001891
§ 371 (c)(1),
(2) Date: Sep. 23, 2015

(87) PCT Pub. No.: WO2014/163302
PCT Pub. Date: Oct. 9, 2014

(65) Prior Publication Data
US 2016/0050647 A1    Feb. 18, 2016

Related U.S. Application Data

(60) Provisional application No. 61/808,602, filed on Apr. 4, 2013.

(51) Int. Cl.
*H04W 72/04* (2009.01)
*H04J 11/00* (2006.01)
(Continued)

(52) U.S. Cl.
CPC ........... *H04W 72/042* (2013.01); *H04J 11/00* (2013.01); *H04L 5/0053* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

2011/0110301 A1    5/2011 Lee et al.
2012/0275428 A1*  11/2012 Feng .................. H04W 72/042
                                                370/330
(Continued)

FOREIGN PATENT DOCUMENTS

CN    101272615 A    9/2008
CN    102137504 A    7/2011
(Continued)

OTHER PUBLICATIONS

Panasonic, "Resource allocation schemes of R-PDCCH", R1-106087, 3GPP TSG RAN WGI Meeting #63, Jacksonville, USA, Nov. 15-19, 2010, pp. 1-3, figure 3.
(Continued)

*Primary Examiner* — Hassan A Phillips
*Assistant Examiner* — Prenell Jones
(74) *Attorney, Agent, or Firm* — Birch, Stewart, Kolasch & Birch, LLP

(57) ABSTRACT

According to one disclosure in the present specification, a receiving method for a user device in a small-scale cell is provided. The receiving method may include: a step of monitoring a plurality of candidate control channels within a search space for a serving cell; and a step of acquiring downlink control information (DCI) by decoding the plurality of candidate control channels. The DCI can include a resource block assignment field, and the resource block assignment field can include information about virtual system bandwidth in the downlink system bandwidth. The receiving method may include a step of receiving a data channel over multiple subframes, based on the virtual system bandwidth.

9 Claims, 15 Drawing Sheets

(51) Int. Cl.
| | |
|---|---|
| H04W 16/24 | (2009.01) |
| H04W 28/20 | (2009.01) |
| H04L 12/46 | (2006.01) |
| H04L 12/64 | (2006.01) |
| H04W 48/08 | (2009.01) |
| H04L 5/00 | (2006.01) |
| H04W 52/04 | (2009.01) |

(52) U.S. Cl.
CPC .......... *H04L 5/0064* (2013.01); *H04L 5/0092* (2013.01); *H04L 12/4641* (2013.01); *H04L 12/6418* (2013.01); *H04W 16/24* (2013.01); *H04W 28/20* (2013.01); *H04W 48/08* (2013.01); *H04W 52/04* (2013.01); *H04L 5/0023* (2013.01)

(56) References Cited

U.S. PATENT DOCUMENTS

| | | | | |
|---|---|---|---|---|
| 2013/0155990 A1* | 6/2013 | Nishio | ............... | H04L 5/0053 370/329 |
| 2013/0176952 A1* | 7/2013 | Shin | ............... | H04L 5/001 370/329 |
| 2013/0343261 A1* | 12/2013 | Gonsa | ............... | H04B 7/2606 370/315 |
| 2014/0254452 A1* | 9/2014 | Golitschek | ............... | H04W 52/0216 370/311 |
| 2015/0036645 A1* | 2/2015 | Shin | ............... | H04L 5/001 370/329 |
| 2015/0189642 A1* | 7/2015 | Yang | ............... | H04L 1/1861 370/311 |
| 2015/0222402 A1* | 8/2015 | Ouchi | ............... | H04L 1/00 370/329 |
| 2016/0254900 A1* | 9/2016 | Ahn | ............... | H04L 1/1812 370/280 |
| 2017/0019888 A1* | 1/2017 | Xia | ............... | H04W 72/042 |
| 2017/0111928 A1* | 4/2017 | Song | ............... | H04W 72/14 |
| 2017/0135135 A1* | 5/2017 | Pelletier | ............... | H04W 74/0833 |
| 2018/0242295 A1* | 8/2018 | Aiba | ............... | H04L 5/001 |

FOREIGN PATENT DOCUMENTS

| | | |
|---|---|---|
| CN | 102142886 A | 8/2011 |
| CN | 102143596 A | 8/2011 |
| KR | 10-2011-0051680 A | 5/2011 |
| WO | WO 2010/133043 A1 | 11/2010 |
| WO | WO 2011/082534 A1 | 7/2011 |
| WO | WO 2012/027732 A1 | 3/2012 |
| WO | WO 2013/024335 A2 | 2/2013 |

OTHER PUBLICATIONS

Panasonic, "Resource allocation schemes of R-PDCCH", R1-110214, 3GPP TSG RAN WG1 Meeting #63bis, Dublin, Ireland, Jan. 17-21, 2011, pp. 1-3, figure 3.

* cited by examiner

RECEIVING METHOD AND USER DEVICE IN SMALL-SCALE CELL

CROSS REFERENCE TO RELATED APPLICATIONS

This application is the National Phase of PCT International Application No. PCT/KR2014/001891, filed on Mar. 7, 2014, which claims priority under 35 U.S.C. 119(e) to U.S. Provisional Application No. 61/808,602, filed on Apr. 4, 2013, all of which are hereby expressly incorporated by reference into the present application.

BACKGROUND OF THE INVENTION

Field of the Invention

The present invention relates to a method of receiving control information via an enhanced physical downlink control channel (EPDCCH).

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V 10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PDCCH is used to transmit downlink control information (DCI) to a UE.

Meanwhile, in a next-generation mobile communication system, regarding a cell coverage radius, a small cell is added inside the coverage of a macro cell. In this case, there is a problem in that it may be ineffective when the small cell directly uses the existing DCI format, or performance cannot be properly exhibited in some cases.

SUMMARY OF THE INVENTION

Accordingly, a disclosure of the present specification aims to solve the aforementioned problem.

In order to achieve the aforementioned purpose, according to one disclosure of the present specification provides a receiving method of a user device in a small cell. The receiving method may comprise: monitoring a plurality of candidate control channels within a search space for the small cell; acquiring downlink control information (DCI) by decoding the plurality of candidate control channels. Here, the DCI may include a resource block assignment field, and the resource block assignment field may include information regarding a virtual system bandwidth instead of a downlink system bandwidth. The receiving method may comprise receiving a data channel from the small cell on a plurality of subframes on the basis of the virtual system bandwidth.

The information regarding the virtual system bandwidth may be expressed by a set of resource blocks (RBs) on the plurality of subframes to be assigned to the user device.

The resource block allocation field may further include resource block group (RBG) size information based on the virtual system bandwidth.

The receiving method may further comprise: receiving, from the serving cell, information regarding whether to assign a resource based on the virtual system bandwidth instead of the downlink system bandwidth.

The DCI including the resource block assignment field may do not include a transmission power control (TPC) command field. The TPC command field is received through different DCI.

The different DCI may use a DCI format 3 or a DCI format 3A.

In order to achieve the aforementioned purpose, according to one disclosure of the present specification provides a user device which can be received from a small cell. The user device may comprise: a radio frequency (RF) unit for monitoring a plurality of candidate control channels within a search space for the small cell; and a processor for acquiring downlink control information (DCI) by decoding the plurality of candidate control channels. The DCI includes a resource block assignment field, and the resource block assignment field includes information regarding a virtual system bandwidth instead of a downlink system bandwidth. The processor may receive a data channel from the small cell on a plurality of subframes on the basis of the virtual system bandwidth.

According to one disclosure of the present specification, downlink control information (DCI) can be improved to be appropriate to a small cell.

DESCRIPTION OF EXEMPLARY EMBODIMENTS

Figure 1:
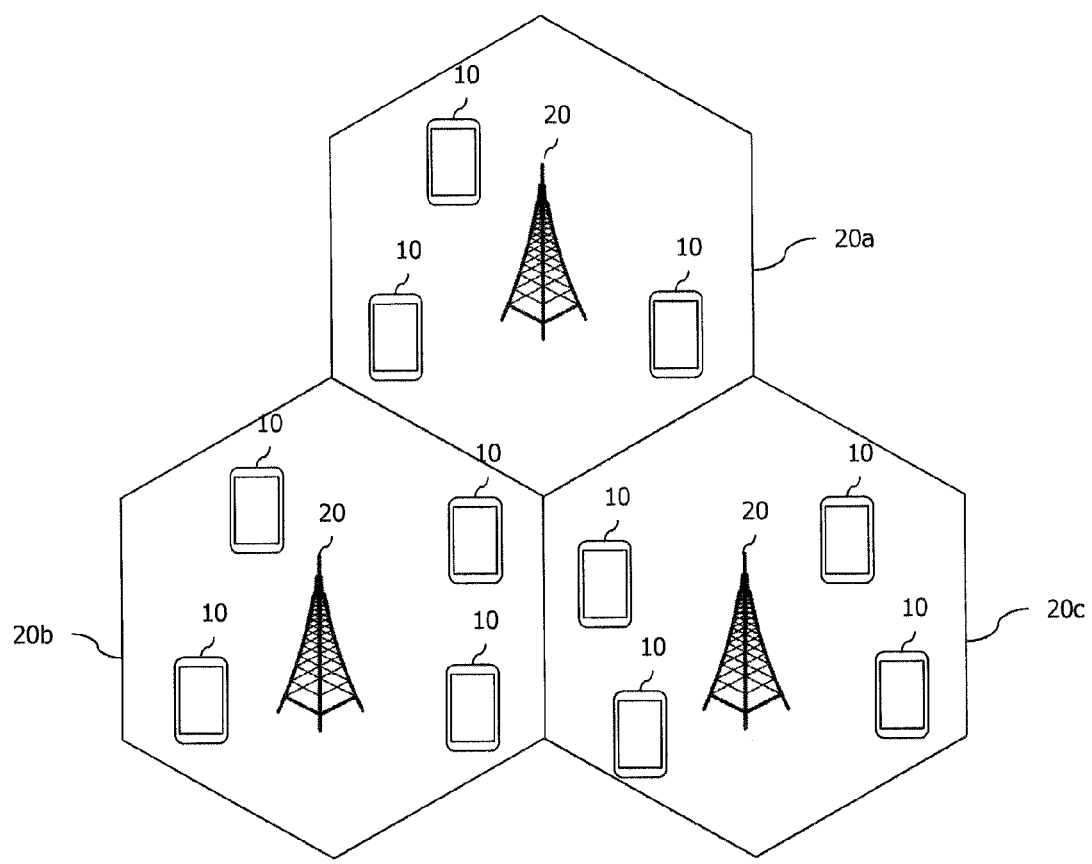
FIG. 1 shows a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

The wireless device may be served by a plurality of serving cells. Each serving cell may be defined as a downlink (DL) component carrier (CC) or a pair of the DL CC and an uplink (UP) CC.

The serving cell may be divided into a primary cell and a secondary cell. The primary cell is a cell which operates at a primary frequency, and performs an initial connection establishment process, starts a connection reestablishment process, or is designated as the primary cell during a handover process. The primary cell is also referred to as a reference cell. The secondary cell operates at a secondary frequency, may be set after an RRC (Radio Resource Control) connection is established, and may be used to provide an additional radio resource. At least one primary cell may be continuously set, and the secondary cell may be add/modified/cancelled by higher layer signaling (e.g., an RRC message).

A cell index (CI) of the primary cell may be fixed. For example, a lowest CI may be designated as the CI of the primary cell. Hereinafter, the CI of the primary cell is 0, and CIs of the secondary cell are sequentially allocated from 1.

FIG. 1 shows a wireless communication system.

The wireless communication system includes at least one base station (BS) 20. Respective BSs 20 provide a communication service to particular geographical areas 20*a*, 20*b*, and 20*c* (which are generally called cells). Each cell may be divided into a plurality of areas (which are called sectors). User equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 20 generally refers to a fixed station that communicates with the UE 10 and may be called by other names such as evolved-NodeB (eNB), base transceiver system (BTS), access point (AP), etc.

The UE generally belongs to one cell and the cell to which the UE belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
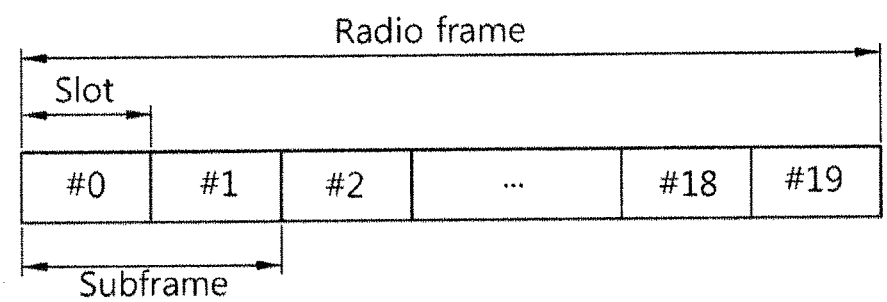
FIG. 2 shows a downlink radio frame structure according to frequency division duplexing (FDD) of 3rd generation partnership project (3GPP) long term evolution (LTE).

FIG. 2 shows a downlink radio frame structure according to FDD of 3rd generation partnership project (3GPP) long term evolution (LTE).

The section 5 of 3GPP TS 36.211 V8.2.0 (2008-03) "Evolved Universal Terrestrial Radio Access (E-UTRA); Physical Channels and Modulation (Release 8)" may be incorporated herein.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Although it is described that one slot includes plural OFDM symbols for example, the number of OFDM symbols included in one slot may vary depending on a length of a cyclic prefix (CP).

Figure 3:
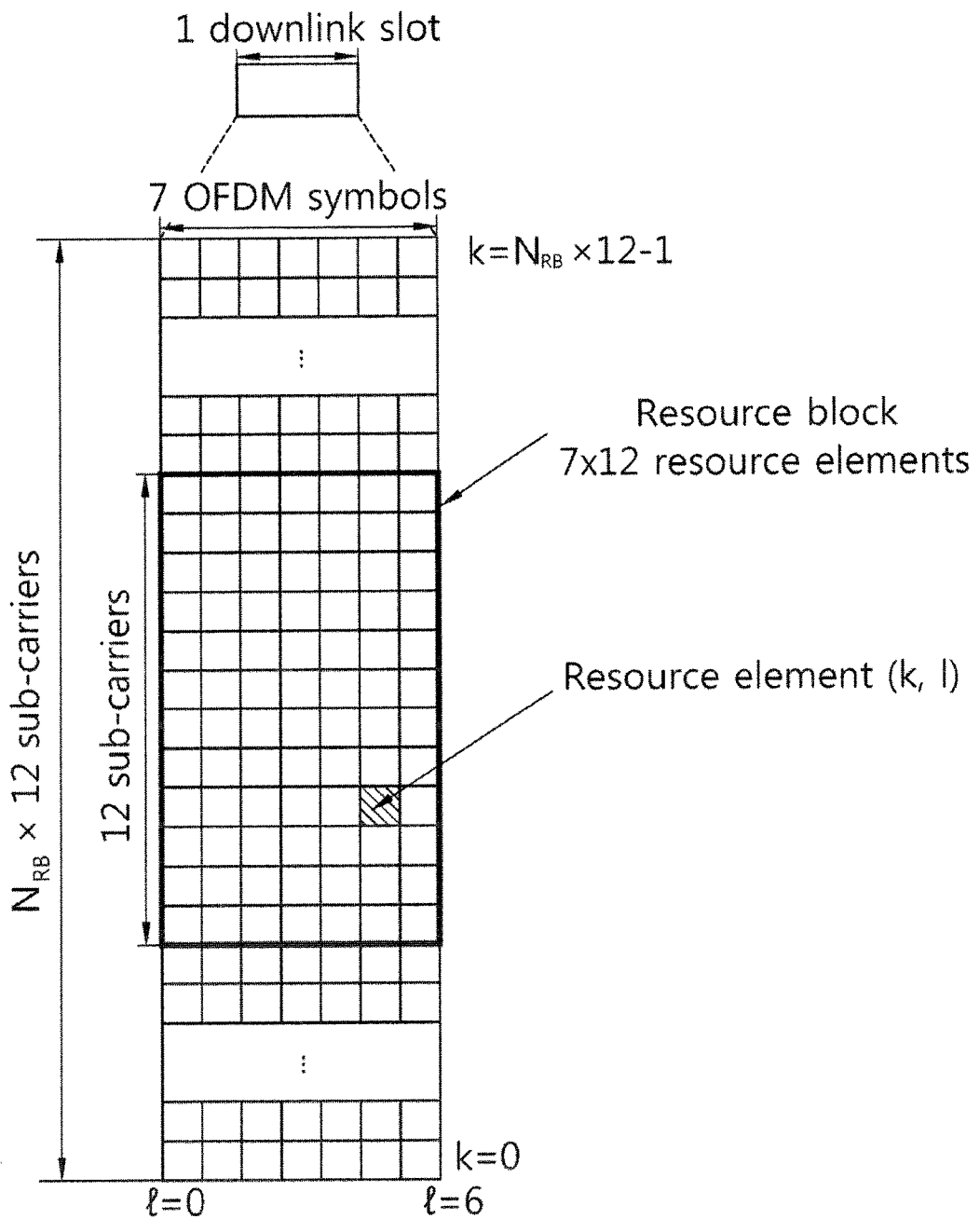
FIG. 3 shows an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 3 may also apply to the resource grid for the downlink slot.

Figure 4:
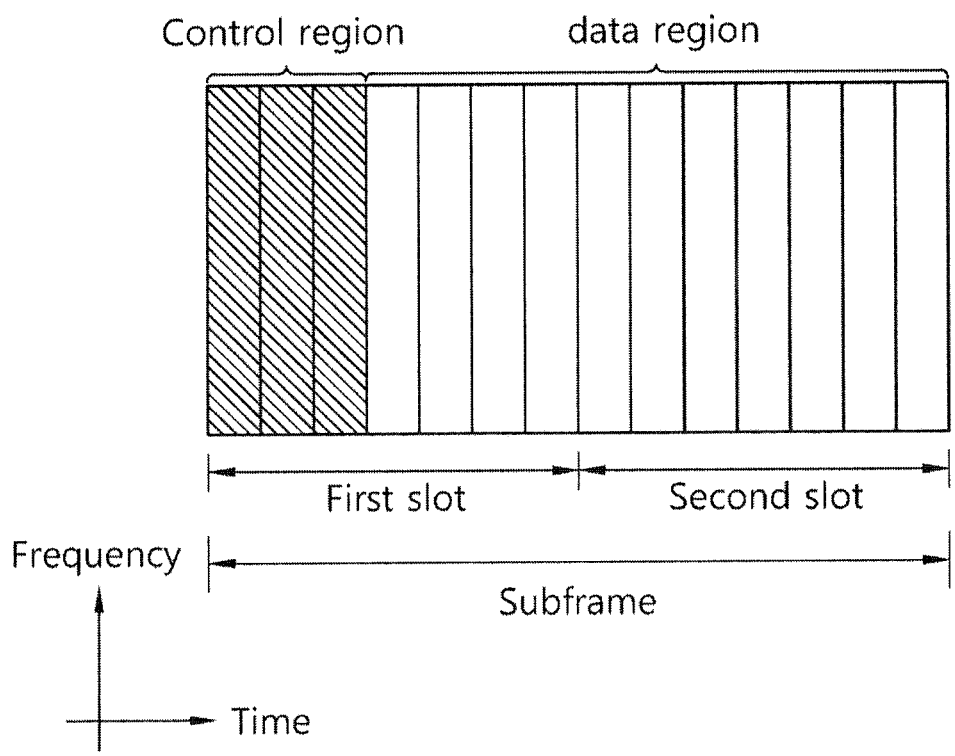
FIG. 4 shows the architecture of a downlink sub-frame.

FIG. 4 illustrates the architecture of a downlink subframe.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 4, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 5:
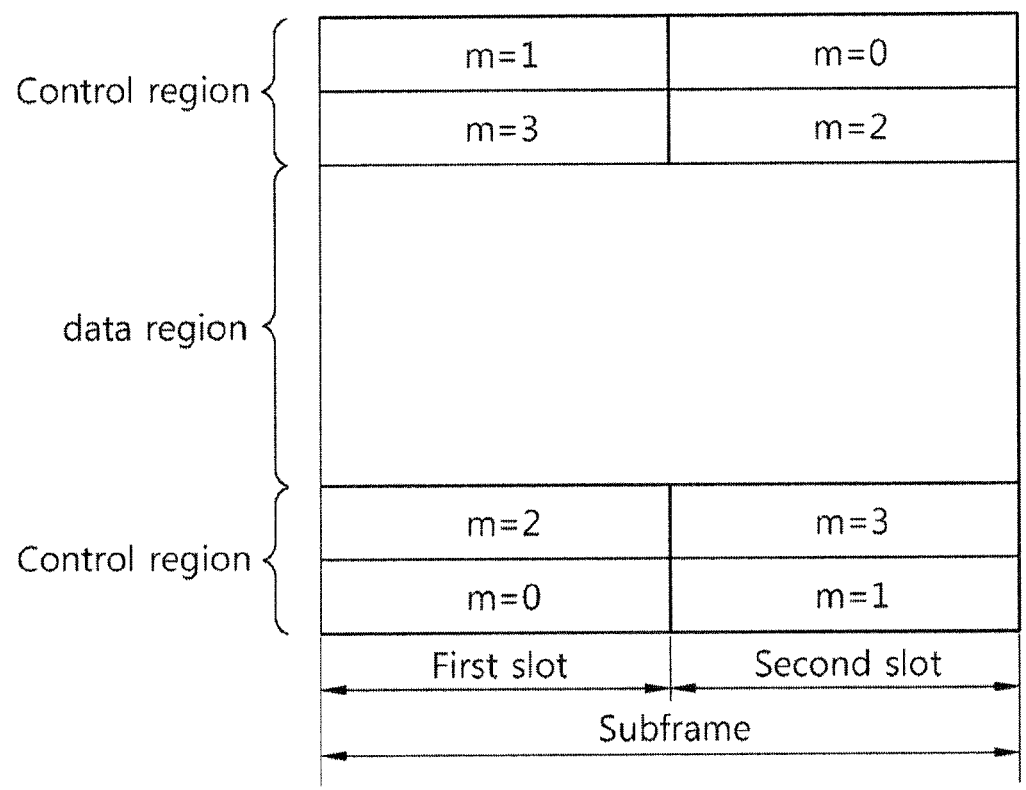
FIG. 5 shows the architecture of an uplink sub-frame in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 6:
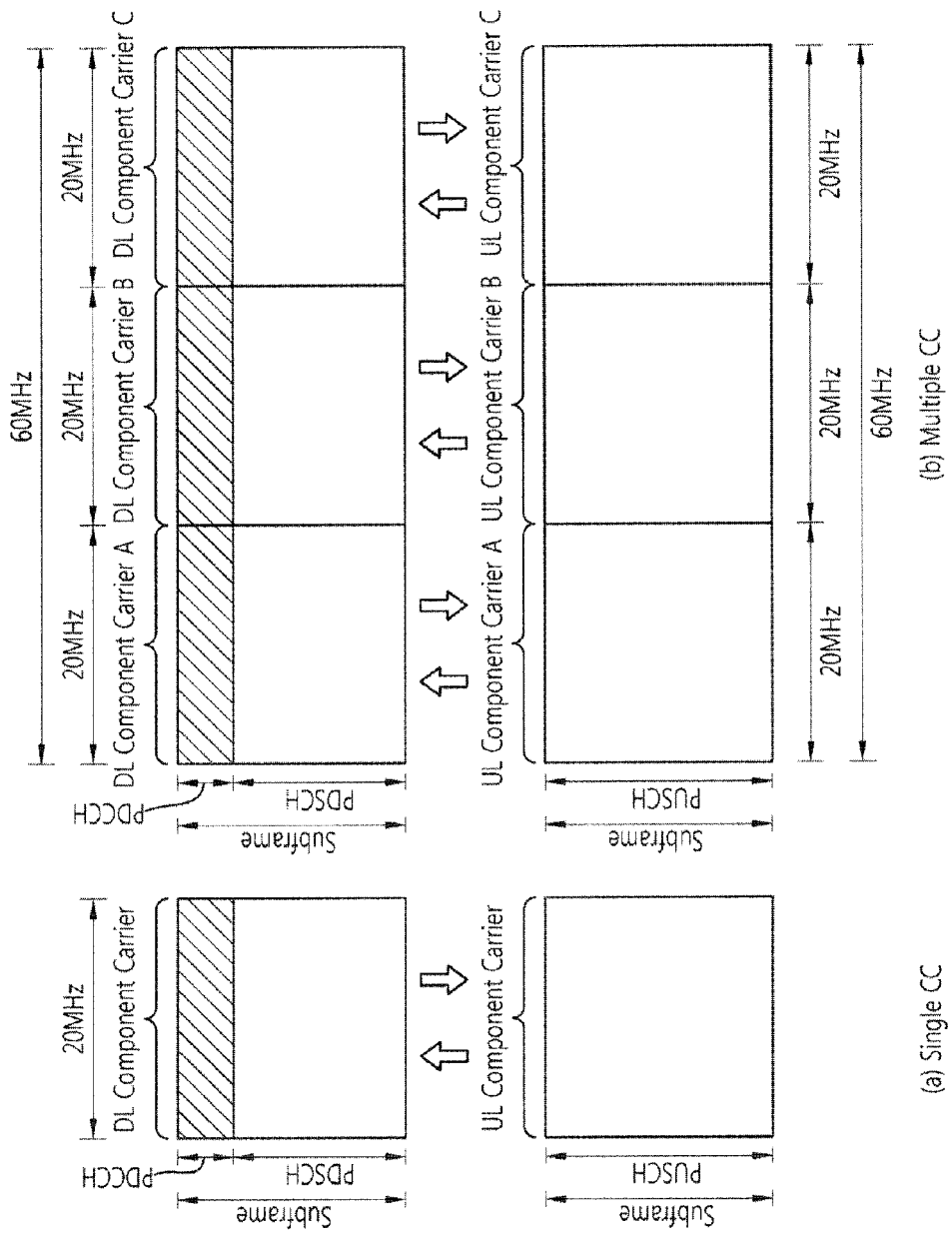
FIG. 6 shows an example of comparison between a single carrier system and a carrier aggregation system.

FIG. 6 illustrates an example of comparison between a single carrier system and a carrier aggregation system.

Referring to FIG. 6, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC.

Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell 2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC(carrier #0)+20 MHz CC(carrier #1)+20 MHz CC(carrier #2) +20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 7:
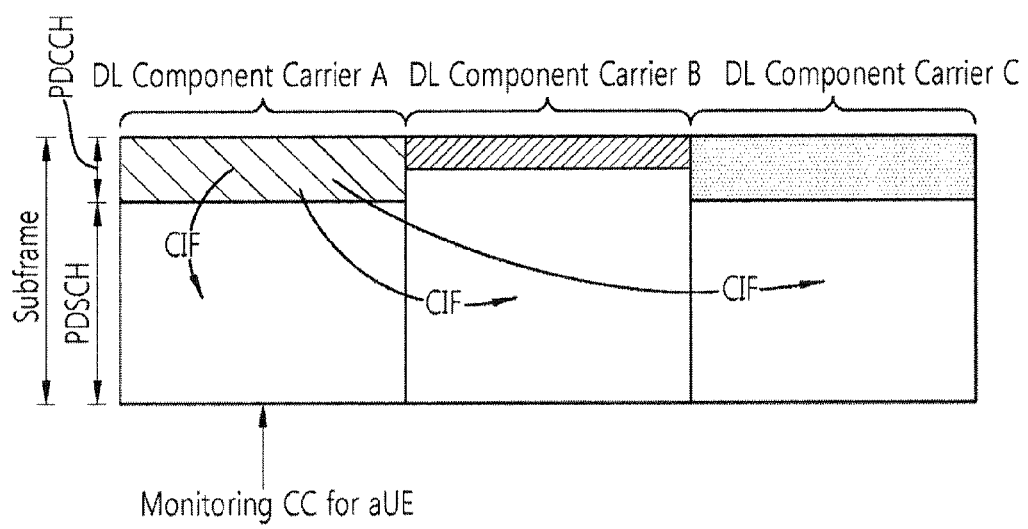
FIG. 7 exemplifies cross-carrier scheduling in the carrier aggregation system.

FIG. 7 exemplifies cross-carrier scheduling in the carrier aggregation system.

Referring to FIG. 7, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 7 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 8:
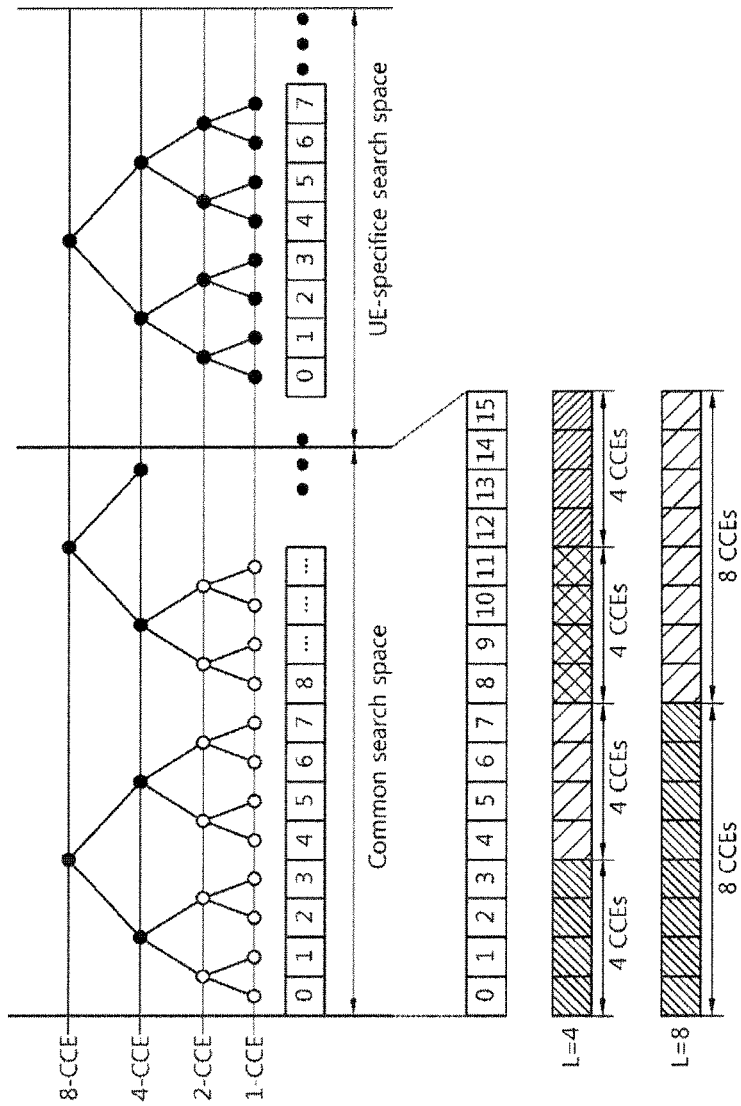
FIG. 8 shows an example of monitoring a physical downlink control channel (PDCCH).

FIG. 8 shows an example of monitoring a PDCCH.

The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 1 shows the number of PDCCH candidates monitored by the wireless device.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{1,2,3,4}, a search space S(L)k is defined as a set of PDCCH candidates. A CCE corresponding to a PDCCH candidate m of the search space S(L)k is given by Equation 1 below.

$$L \cdot \{(Y_k + m') \bmod \lfloor N_{CCE,k}/L \rfloor\} + i \quad \text{[Equation 1]}$$

Herein, $i=0, 1, \ldots, L-1$, $m=0, \ldots, M^{(L)}-1$, and $N_{CCE,k}$ denotes the total number of CCEs that can be used for PDCCH transmission in a control region of a subframe k. The control region includes a set of CCEs numbered from 0 to $N_{CCE,k}-1$. $M^{(L)}$ denotes the number of PDCCH candidates in a CCE aggregation level L of a given search space.

If a carrier indicator field (CIF) is set to the wireless device, $m'=m+M^{(L)} n_{cif}$. Herein, $n_{cif}$ is a value of the CIF. If the CIF is not set to the wireless device, $m'=m$.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D \quad \text{[Equation 2]}$$

Herein, $Y_{-1} = n_{RNTI} \neq 0$, A=39827, D=65537, k=floor($n_s/2$), and $n_s$ denotes a slot number in a radio frame.

When the wireless device monitors the PDCCH by using the C-RNTI, a search space and a DCI format used in monitoring are determined according to a transmission mode of the PDSCH. Table 2 below shows an example of PDCCH monitoring in which the C-RNTI is set.

TABLE 2

| Transmission mode | DCI format | search space | Transmission mode of PDSCH based on PDCCH |
|---|---|---|---|
| Mode 1 | DCI format 1A | common and UE specific | Single antenna port, port 0 |
|  | DCI format 1 | UE specific | Single antenna port, port 0 |
| Mode 2 | DCI format 1A | common and UE specific | Transmit diversity |
|  | DCI format 1 | UE specific | Transmit diversity |
| Mode 3 | DCI format 1A | common and UE specific | Transmit diversity |
|  | DCI format 2A | UE specific | CDD(Cyclic Delay Diversity) or Transmit diversity |
| Mode 4 | DCI format 1A | common and UE specific | Transmit diversity |
|  | DCI format 2 | UE specific | Closed-loop spatial multiplexing |
| Mode 5 | DCI format 1A | common and UE specific | Transmit diversity |
|  | DCI format 1D | UE specific | MU-MIMO(Multi-user Multiple Input Multiple Output) |
| Mode 6 | DCI format 1A | common and UE specific | Transmit diversity |
|  | DCI format 1B | UE specific | Closed-loop spatial multiplexing |
| Mode 7 | DCI format 1A | common and UE specific | If the number of PBCH transmission ports is 1, single antenna port, port 0, otherwise Transmit diversity |
|  | DCI format 1 | UE specific | Single antenna port, port 5 |
| Mode 8 | DCI format 1A | common and UE specific | If the number of PBCH transmission ports is 1, single antenna port, port 0, otherwise, Transmit diversity |

TABLE 2-continued

| Transmission mode | DCI format | search space | Transmission mode of PDSCH based on PDCCH |
|---|---|---|---|
|  | DCI format 2B | UE specific | Dual layer transmission (port 7 or 8), or single antenna port, port 7 or 8 |

The usage of the DCI format is classified as shown in Table 3 below.

TABLE 3

| DCI format | Contents |
|---|---|
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |

The DCI formats may commonly include a resource block assignment field, a 5-bit modulation and coding scheme (MCS)-related field, a 2-bit TPC command field, etc.

The resource allocation field may be $\lceil N_{RB}^{DL}/P \rceil$ or $(\lceil N_{RB}^{DL/P} \rceil - \lceil \log_2(P) \rceil - 1)$ in case of a DCI format for PDSCH assignment, e.g., a DCI format 1. $N_{RB}^{DL}$ is a downlink system bandwidth configuration expressed by the number of resource blocks (RBs) in one subframe. P indicates a size of a resource assignment group (RBG), and has a value as shown in Table 4 below.

TABLE 4

| System bandwidth $N_{RB}^{DL}$ | RBG size (P) |
|---|---|
| ≤10 | 1 |
| 11-26 | 2 |
| 27-63 | 3 |
| 64-110 | 4 |

Figure 9A:
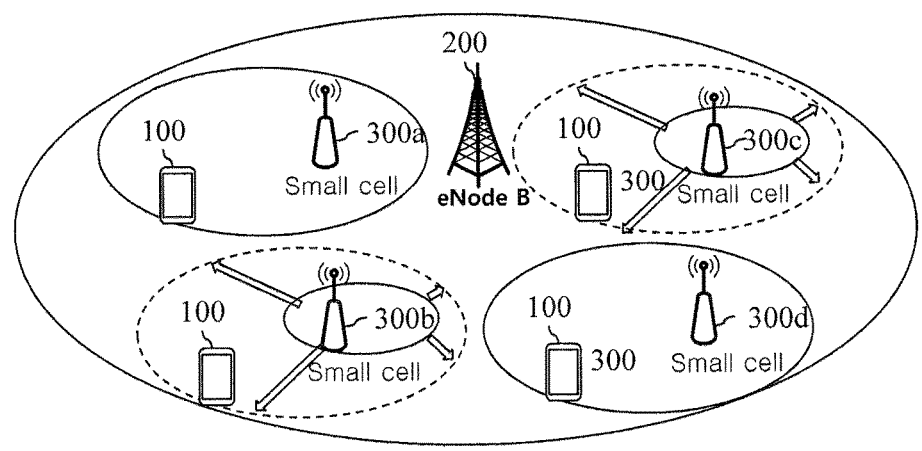
FIG. 9a shows a heterogeneous network environment in which a macro cell and a small cell co-exist and which is possibly used in a next-generation wireless communication system.

FIG. 9a shows a heterogeneous network environment in which a macro cell and a small cell co-exist and which is possibly used in a next-generation wireless communication system.

A heterogeneous network in which one or more small cells 300a, 300b, 300c, and 300d (e.g., a pico cell, a femto cell, or a micro cell) having lower-power transmit power exists in the coverage of a legacy marco cell 200 in an overlapping manner is under discussion in a next-generation communication standard after 3GPP LTE/LTE-A.

Referring to FIG. 9a, the macro cell 200 may overlap with one or more small cells 300. A service of the macro cell 200 is provided by a macro eNodeB (MeNB). In the present specification, the macro cell and the MeNB may be used together. A UE 100 having access to the macro cell 200 may be referred to as the macro UE 100. The marco UE 100 receives a downlink signal from the MeNB, and transmits an uplink signal to the MeNB.

The aforementioned small cells 300a, 300b, 300c, and 300d are also referred to as a femto cell, a pico cell, or a micro cell. A service of the small cell is provided by a pico eNodeB, a home eNodeB (HeNB), a relay node (RN), etc. For convenience, the pico eNodeB, the HeNB, and the RN are collectively referred to as the HeNB. In the present specification, the micro cell and the HeNB may be used together. The small cell may be divided into an open access (OA) cell and a closed subscriber group (CSG) cell according to an accessibility. The OA cell implies a cell in which the UE 100 can receive a service anytime when necessary without an additional access restriction. On the other hand, the CSG cell implies a cell in which only the authorized specific UE 100 can receive a service.

In such a heterogeneous network, an empty space in the coverage of the macro cell can be filled by configuring the macro cell as a primary cell (Pcell) and by configuring the small cell as a secondary cell (Scell). In addition, overall performance can be boosted by configuring the small cell as the Pcell and by configuring the macro cell as the Scell.

Figure 9B:
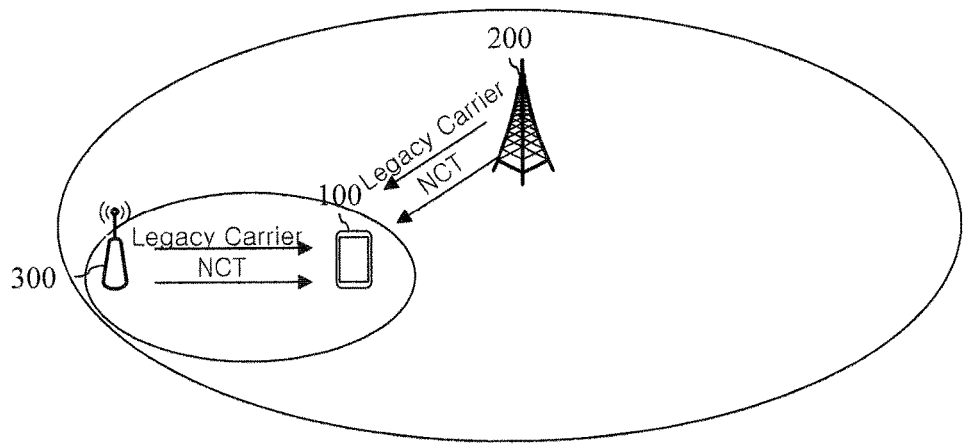
FIG. 9B shows an example of a new carrier for a next-generation wireless communication system.

FIG. 9B shows an example of a new carrier for a next-generation wireless communication system.

The conventional 3GPP LTE/LTE-A-based wireless communication system transmits a reference signal, a synchronization signal, a control channel, etc, through a downlink carrier. As such, a downlink carrier based on 3GPP LTE/LTE-A is called a legacy carrier.

However, a new carrier can be introduced in a next-generation wireless communication system after LTE/LTE-A to mitigate interference between a plurality of serving cells and to improve extensibility of a carrier. This is called an extension carrier or a new carrier type (NCT). A cell based on the extension carrier is called an extension cell.

If a subframe having a legacy format is used in a primary cell, i.e., a PCell and an NCT subframe is used in a secondary cell, i.e., an SCell, a configuration for the subframe may be signaled through the primary cell, i.e., the PCell. The secondary cell, i.e., the SCell, in which the NCT subframe is used, may be activated by the primary cell.

In the NCT, transmission of a CRS which is transmitted with a fixed high density is omitted or significantly reduced. In the legacy carrier, the CRS is transmitted in all downlink subframes across a full system band, whereas in the NCT, the CRS may not be transmitted or may be transmitted in a specific downlink subframe across a part of a system band. Accordingly, in the NCT, the CRS may not be used in demodulation and may be used only in synchronization tracking, and in this sense, the CRS may also be celled a tracking RS (TRS) or an enhanced synchronization signal (eSS) or a reduced CRS (RCRS).

In the legacy carrier, a PDCCH is demodulated based on the CRS, whereas in the NCT, the PDCCH may not be transmitted. In the NCT, only a DMRS (or URS) is used in data demodulation.

Accordingly, a UE receives downlink data on the basis of the DMRS (or URS), and measures a channel state on the basis of a CRI-RS transmitted relatively less frequently.

When using the NCT, an overhead caused by a reference signal is minimized, and thus reception performance is boosted and a radio resource can be effectively used.

As described up to now, a plurality of small cells may be employed in a next-generation system after LTE/LTE-A as one method for boosting performance. In addition, the next-generation system may use an NCT in which a CRS (TRS) is transmitted only in a limited region.

On the other hand, in the next-generation system, a UE may be connected also to a macro cell simultaneously while having access to a small cell. In this case, the small cell may support a user plane, and the macro cell may support a control plane. Further, the small cell may use a scheme of increasing spectrum efficiency similarly to 256QAM. Furthermore, the small cell may be on or off according to a situation under the purpose of interference management/energy efficiency.

In the aforementioned next-generation system, there is a problem in that it may be ineffective when the small cell directly uses the existing DCI format, or performance cannot be properly exhibited in some cases. In order to solve this problem, there is a need to re-design or modify DCI suitable for the small cell.

Accordingly, disclosures of the present specification aim to newly propose the DCI suitable for the small cell.

<Brief Description on Method According to the Disclosure of the Present Specification>

First, according to a first disclosure of the present specification, a resource block assignment field in DCI is newly provided. Further, according to a second disclosure of the present specification, a transmission power control (TPC) field in DCI is newly provided. In addition, according to a third disclosure of the present specification, a modulation and coding scheme (MCS) field in DCI is newly provided.

According to a first embodiment of the first disclosure, a serving cell may configure a PRB set on the basis of a DMRS pattern, and thereafter may indicate PRB information selectively assigned in the PRB set to the resource block assignment field in the DCI. Further, according to a second embodiment of the first disclosure, the serving cell may configure the PRB set in a resource region excluding center 6RBs in which a CRS is transmitted, and thereafter may indicate the PRB information selectively assigned in the PRB set to the resource block assignment field in the DCI. According to a third embodiment of the first disclosure, the serving cell may configure a virtual system bandwidth, and may indicate the virtual system bandwidth to the resource block assignment field in the DCI.

<First Disclosure of the Present Specification>

First, referring to FIG. 10 and FIG. 11, the first embodiment of the first disclosure is described as follows.

Figure 10:
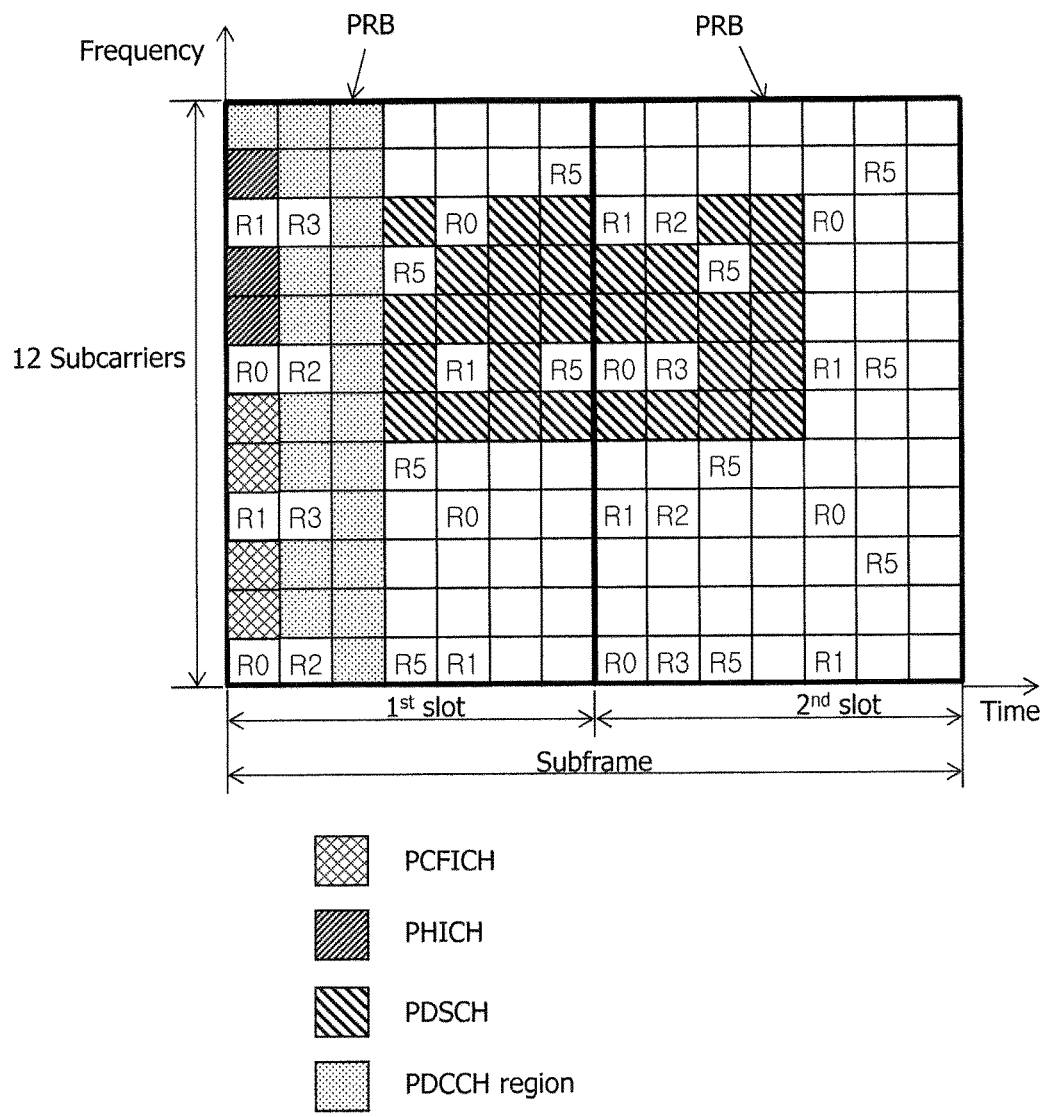
FIG. 10 shows an example of deploying a control channel and a reference signal in a downlink (DL) subframe of a 3GPP LTE to facilitate understanding of a first embodiment of a first disclosure.

FIG. 10 shows an example of deploying a control channel and a reference signal in a DL subframe of a 3GPP LTE to facilitate understanding of the first embodiment of the first disclosure.

A control region (or a PDCCH region) includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region in which the UE monitors the PDCCH.

Various reference signals are also transmitted in a subframe.

A cell-specific reference signal (CRS) can be received by all wireless devices in a cell, and is transmitted across a full downlink frequency band. In the figure, 'R0' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

The CRS is used for demodulation of the PDCCH.

An RS sequence $r_{l,ns}(m)$ for the CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m + 1))$$  [Equation 3]

In Equation 3, m=0, 1, . . . , $2N_{maxRB}$–1, where $N_{maxRB}$ is the maximum number of RBs, ns is a slot number in a radio frame, and l is an OFDM symbol number in a slot. A pseudo-random sequence c(i) is defined by a length-31 Gold sequence as follows.

$c(n)=(x_1(n+Nc)+x_2(n+Nc))$ mod 2

$x_1(n+31)=(x_1(n+3)+x_1(n))$ mod 2

$x_2(n+31)=(x_2(n+3)+x_2(n+2)+x_2(n+1)+x_2(n))$ mod 2  [Equation 4]

In Equation 4, Nc=1600, and a first m-sequence is initialized as x1(0)=1, x1(n)=0, M=1,2, . . . ,30.

A second m-sequence is initialized as $c_{init}=2^{10}(7(ns+1)+l+1)(2N^{cell}_{ID}+1)+2N^{cell}_{ID}+N_{CP}$ at a start of each OFDM symbol.

$N^{cell}_{ID}$ is a physical cell identifier (PCI). $N_{CP}=1$ in a normal CP case, and $N_{CP}=0$ in an extended CP case.

A demodulation reference signal (DMRS) is transmitted in the subframe. Whereas the CRS is transmitted in the entire region of the subframe, the DMRS is transmitted in a data region of the subframe and is used to demodulate the PDSCH. In the figure, 'R5' indicates an RE used to transmit the DMRS. The DMRS is also called a dedicated reference signal (DRS) or a user-specific reference signal (URS).

The DMRS is transmitted only in an RB to which a corresponding PDSCH is mapped. Although R5 is indicated in the figure in addition to a region in which the PDSCH is transmitted, this is for indicating a location of an RE to which the DMRS is mapped.

The DMRS is used only by a wireless device which receives a corresponding PDSCH. A reference signal (RS) sequence $r_{ns}(m)$ for the DMRS is equivalent to Equation 3. In this case, m=0,1, . . . , $12N_{PDSCH,RB}$–1, and $N_{PDSCH,RB}$ is the number of RBs used for transmission of a corresponding PDSCH. A pseudo-random sequence generator is initialized as $c_{init}=(floor(ns/2)+1)(2N^{cell}_{ID}+1)2^{16}+n_{RNTI}$ at a start of each subframe. $n_{RNTI}$ is an identifier of the wireless device.

The aforementioned initialization method is for a case where the DMRS is transmitted through the single antenna, and when the DMRS is transmitted through multiple antennas, the pseudo-random sequence generator is initialized as $c_{init}=(floor(ns/2)+1)(2N^{cell}_{ID}+1)2^{16}+n_{SCID}$ at a start of each subframe. $n_{SCID}$ is a scrambling identity (SCID) acquired from a DL grant (e.g., a DCI format 2B or 2C) related to PDSCH transmission.

The DMRS supports multiple input multiple output (MIMO) transmission. According to an antenna port or a layer, an RS sequence for the DMRS may be spread into a spread sequence as follows.

TABLE 5

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |

TABLE 5-continued

| Layer | [w(0) w(1) w(2) w(3)] |
|---|---|
| 7 | [+1 −1 −1 +1] |
| 8 | [−1 +1 +1 −1] |

A layer may be defined as an information path which is input to a precoder. A rank is a non-zero eigenvalue of a MIMO channel matrix, and is equal to the number of layers or the number of spatial streams. The layer may correspond to an antenna port for identifying a DMRS and/or a spread sequence applied to the DMRS.

Figure 11:
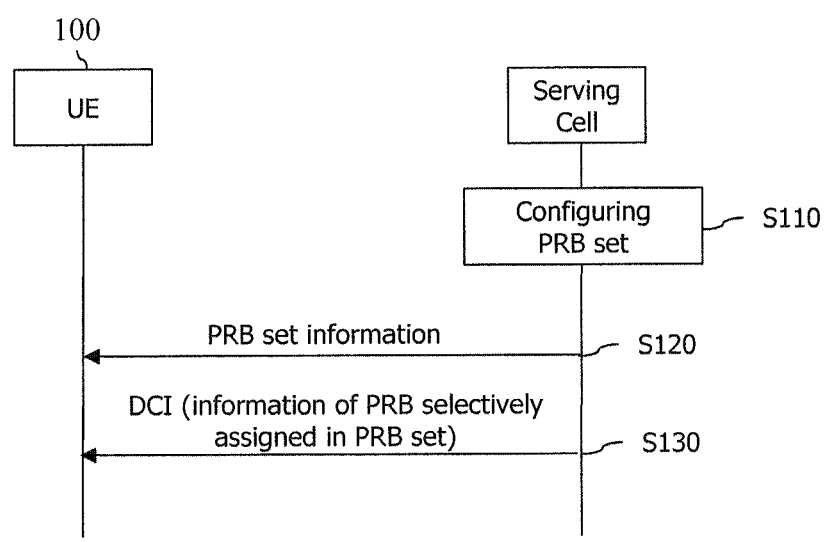
FIG. 11 is a flowchart briefly showing a method according to a first embodiment of a first disclosure.

FIG. 11 is a flowchart briefly showing a method according to the first embodiment of the first disclosure.

As described above, in an NCT, transmission of a CRS for demodulation of a PDCCH may be omitted or reduced, and only a DMRS (or URS) may be transmitted for data demodulation, for example, demodulation of a PDSCH. However, the first embodiment is not limited to the NCT, but is applicable as long as the DMRS is used to demodulate a data channel.

First, a serving cell may configure a PRB set (S110). The PRB set may be configured on the basis of the DMRS. Herein, the DMRS may be identified according to a criterion such as a DMRS pattern or a precoding matrix or the like. Accordingly, the serving cell may configure a PRB including the DMRS which uses the same DMRS pattern or precoding as one set.

Subsequently, the serving cell may report information on the PRB set through a higher layer signal or in a UE-specific manner or may report the information through a control signal (S120).

Thereafter, the serving cell may allow downlink control information (DCI) to include a resource block assignment field indicating a PRB selectively assigned in the PRB set, and may transmit it to a UE 100 (S130). Herein, when in a dual-connectivity state in which the UE simultaneously accesses to a macro cell and a small cell, the serving cell which transmits the DCI may be the macro cell.

In addition, there may be various methods of expressing the PRB selectively assigned in the PRB set through the resource block assignment field.

For example, the resource block assignment field may be bits expressing the PRB selectively assigned in the PRB set.

For another example, the resource block assignment field may be expressed by an equation using a PRB set and a group size based on a size of the PRB set, unlike the conventional way of expressing it by an equation using a downlink system bandwidth (i.e., the number of PRBs) and a PRB group size (denoted by P). The size of the PRB set may be determined again by considering a case of having the greatest size with respect to a plurality of PRB sets, and may be determined by excluding from the PRB set a PRB in which a DMRS is not transmitted (for example, a PRB region in a subframe in which an SS/PBCH is transmitted). Specifically, for example, when the number of PRBs constituting the PRB set is denoted by $N_{RB}^{Set}$, the size P of the PRB group constituting the selected PRB set may be reconfigured as shown in the following table.

TABLE 6

| System bandwidth $N_{RB}^{Set}$ | RBG size (P) |
|---|---|
| ≤10 | 1 |
| 11-26 | 2 |
| 27-63 | 3 |
| 64-110 | 4 |

For the P configured with respect to the PRB set, the number of RBGs constituting the PRB set may be expressed by $N_{RBG}=\lceil N_{RB}^{Set}/P \rceil$.

Therefore, the total number of bits of the resource block assignment field may be $\lceil N_{RB}^{Set}/P \rceil$ or $\lceil \log_2(N_{RB}^{Set}(N_{RB}^{Set}+1)/2) \rceil$ according to a DCI format.

Figure 12:
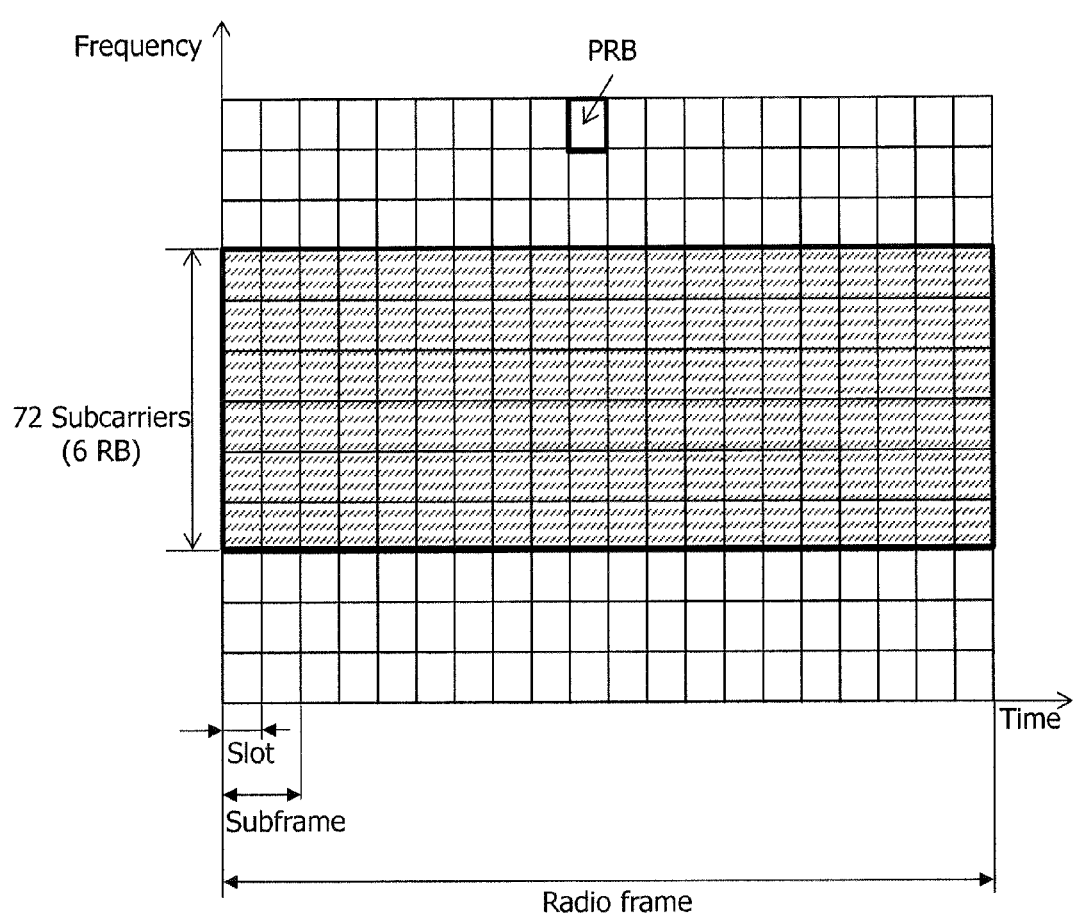
FIG. 12 shows an example of dividing a radio resource into a segment to facilitate understanding of a second embodiment of a first disclosure.

FIG. 12 shows an example of dividing a radio resource into a segment to facilitate understanding of the second embodiment of the first disclosure.

As shown in FIG. 12, a radio resource in one carrier may be divided into a segment in which a CRS is transmitted similarly to a legacy carrier and a segment in which the CRS is not transmitted and only a DMRS is transmitted similarly to an NCT. 72 subcarriers (6 RBs, or if the number of PRBs is an odd number, 5 RBs or 7 RBs) indicated by a shadow in FIG. 12 indicate the segment in which the CRS is transmitted similarly to the legacy carrier. In addition, an area other than a shadow area is the segment in which the CRS is not transmitted and only the DMRS is transmitted similarly to the NCT.

Figure 13:
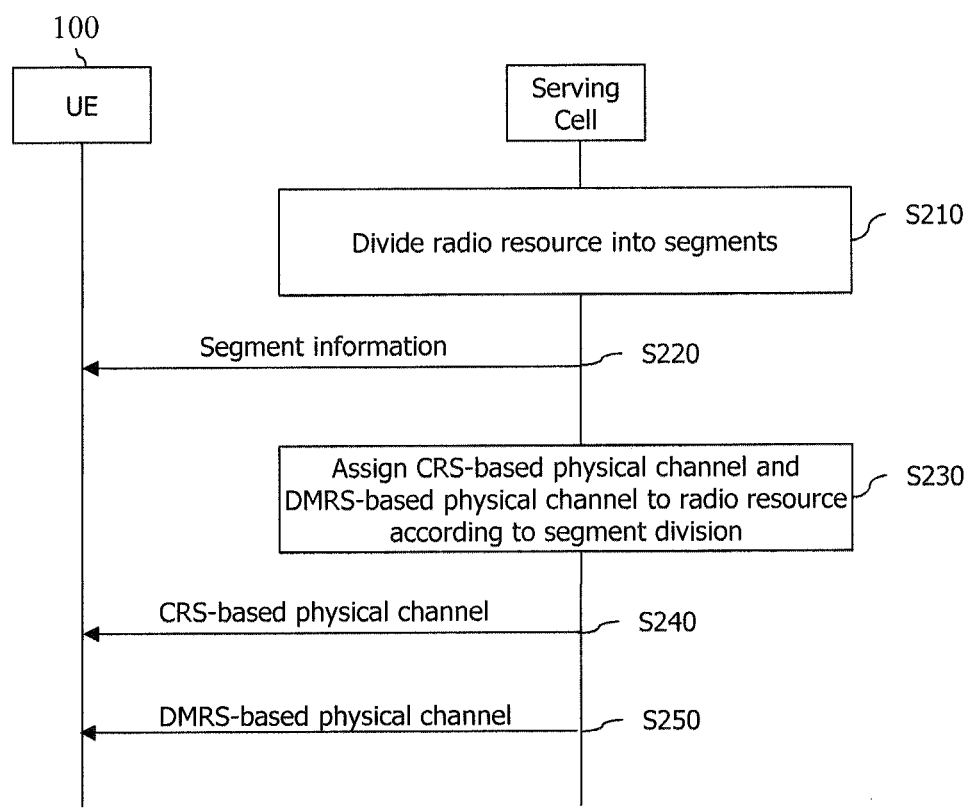
FIG. 13 is a flowchart briefly showing a method according to a second embodiment of a first disclosure.

FIG. 13 is a flowchart briefly showing a method according to the second embodiment of the first disclosure.

As can be seen from FIG. 13, a small cell which is a serving cell may divide a radio resource in one carrier into a segment in which a CRS is transmitted similarly to a legacy carrier and a segment in which the CRS is not transmitted and only a DMRS is transmitted similarly to an NCT (S210). That is, the small cell may use a carrier having a format in which the legacy carrier and the NCT are combined.

Subsequently, the small cell which is the serving cell may deliver information regarding the segment of the carrier to the UE 100. The information regarding the segment may be delivered through system information.

Subsequently, as to a physical channel, for example, a PDCCH, which is demodulated by using the CRS, the small cell may assign a resource only in the segment in which the CRS is transmitted. Further, the small cell may assign the resource in all PRBs as to a physical channel, for example, a PDSCH, which is demodulated by using the DMRS, and may assign the resource only in PRBs in the segment in which the CRS is not transmitted (S230). Herein, the reason of assigning the resource only in the PRBs in the segment in which the CRS is not transmitted is to ensure a space of the physical channel, for example, the PDSCH, which is demodulated by using the CRS. In other words, the small cell may assign the resource only in a set of the PRBs in which the CRS is not transmitted, as to the physical channel, for example, the PDSCH, which is demodulated by using the DMRS.

Further, the small cell which is the serving cell may transmit the CRS-based physical channel and the DMRS-based physical channel through each assigned radio resource (S240, S250).

Meanwhile, in a situation where the small cell is densely deployed, the number of UEs accessing to each small cell may be relatively small in comparison with a macro cell environment, and the number of PRBs assigned for each UE may also be increased. In such a small cell environment, when the aforementioned segment is employed, it may be ineffective to restrict a transport mode (TM) or to restrict a PRB which is a target of resource block assignment. Therefore, in such a situation, a plurality of TMs may be allowed even for one PDSCH. As such, the use of the plurality of TMs for one PDSCH may be allowed only for a small cell which employs a segment of a carrier. Information regarding whether to allow the plurality of TMs may be reported to the UE through a higher layer signal. In the plurality of TMs, it is allowed to simultaneously support a CRS-based TM and a DMRS-based TM. The following is a specific example for a DCI configuration method supporting the plurality of TMs.

As a first example, a small cell which is a serving cell may independently configure one TM for each transport block, and may deliver the configuration information to a n. The configuration information may be transmitted to the UE through a higher layer signal, or may be transmitted by being included in DCI. The configuration information included in the DCI may be an indicator bit for TMs predetermined in a higher layer. For each transport block, a combination of a resource block assignment field, MCS field, NDI field, RV field, etc., may be included in the DCI. The resource block assignment field is for a PRB corresponding to a CRS region in case of the CRS-based TM and for a PRB excluding the CRS region in case of the DMRS-based TM.

As a second example, a small cell which is a serving cell may allow to support the CRS-based TM and the DMRS-based TM for each transport block. Whether the plurality of TMs are supported may be reported to a UE through an indicator field in DCI. For each TM, the resource block assignment field may be independently included in the DCI. The resource block assignment field is for a PRB corresponding to a CRS region in case of the CRS-based TM and for a PRB excluding the CRS region in case of the DMRS-based TM.

On the basis of the LTE-A release 10, in case of a TM corresponding to two TBs, it may be considered to configure the two TBs by adjusting to the same TM, and it may be allowed to perform a MIMO operation through multiple-layer mapping with respect to one TB. In this case, the number of bits of the resource block assignment field may use the number of PRBs constituting a corresponding PRB region as a parameter instead of a downlink system bandwidth. Also, in case of an RBG size, the number of PRBs of the corresponding PRB region may be used as the parameter instead of the downlink system bandwidth.

Figure 14:
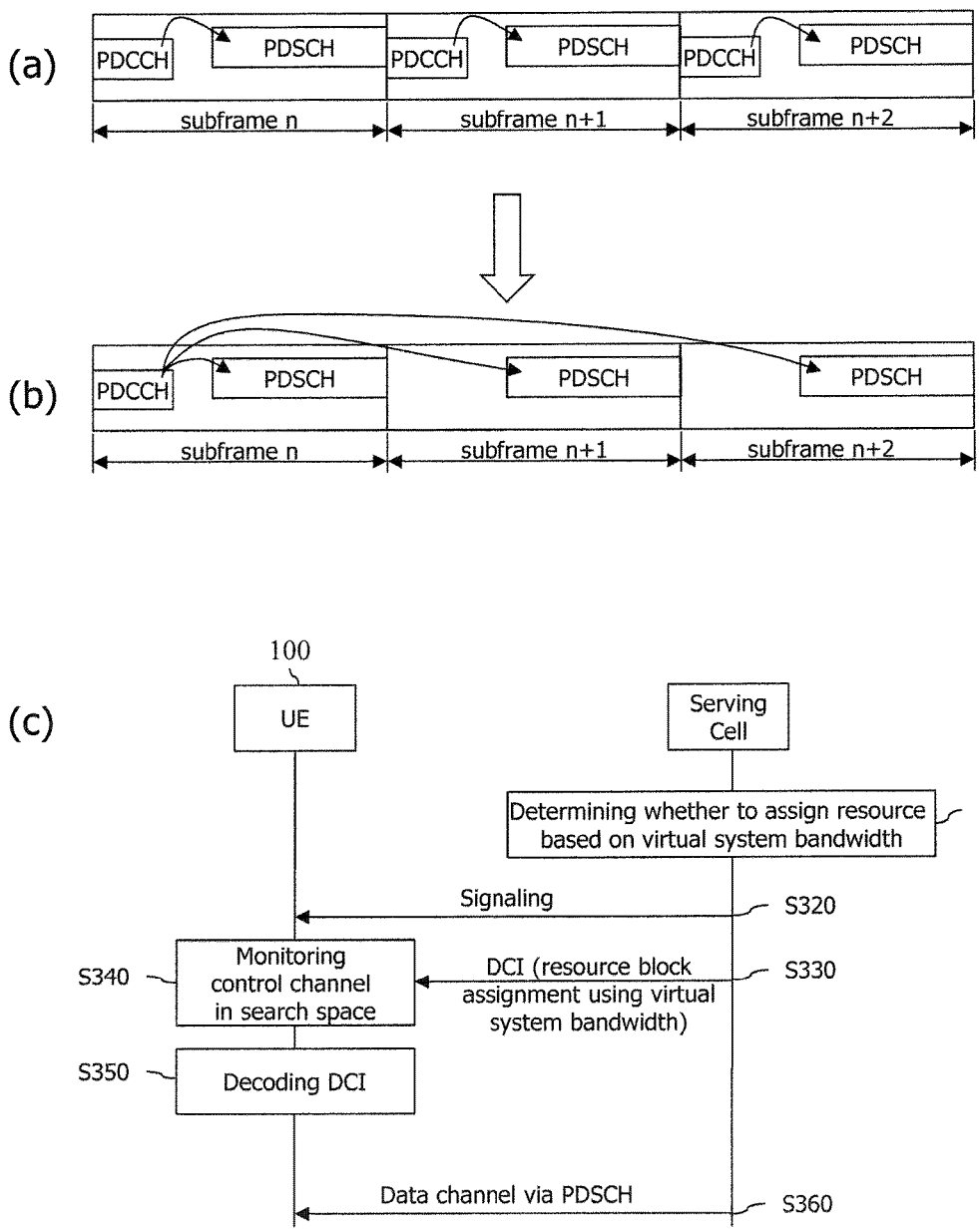
FIG. 14 shows an example of a method according to a third embodiment of a first disclosure.

FIG. 14 shows an example of a method according to the third embodiment of the first disclosure.

As shown in FIG. 14(a), according to the conventional LTE/LTE-A, resource assignment for a PDSCH in an $n^{th}$ subframe is reported by DCI in a PDCCH of an $n^{th}$ subframe. That is, a serving cell performs the resource assignment for the PDSCH every subframe.

However, the number of UEs accessing to each small cell may be relatively small in comparison with a macro cell environment, and a data requirement amount for each UE may be relatively great. In such an environment, similarly to the conventional LTE/LTE-A, it may be ineffective to perform the resource assignment for the PDSCH every subframe.

As a simple method for solving this problem, it may be considered a method of assigning a full system bandwidth of a small cell or a significantly great number of PRBs to a UE. However, this method may be ineffective in a case where the system bandwidth of the small cell is small.

Therefore, as shown in FIG. 14(b), in the method according to the third embodiment of the first disclosure, it is allowed to assign resources across a plurality of subframes through one DCI.

Specifically, for example, in the resource assignment field, the number of subframes to be assigned simultaneously may be expressed as a parameter.

For another example, instead of the conventional resource assignment field which uses a downlink system bandwidth $N_{RB}^{DL}$ expressed by the number of resource blocks (RBs) in one subframe, a virtual system bandwidth (BW) in the resource assignment field may be used. For example, if the downlink system bandwidth is 6 RBs and the number of subframes simultaneously assigned is 3, the serving cell may configure the virtual system BW in the DCI to 18 RBs. In this case, an RBG size P in the DCI may also be configured according to the virtual system bandwidth. As such, whether the small cell will assign an RB for a plurality of subframes by using the single DCI may be reported to the UE through a higher layer signal, and a subframe which is a target of the assignment may be reported to the UE through the higher layer signal or may be reported through information in the DCI.

More specifically, as shown in FIG. 14(c), according to the method of the third embodiment of the first disclosure, instead of the conventional resource assignment method which uses the downlink system bandwidth $N_{RB}^{DL}$, the serving cell determines whether to assign a resource on the basis of the virtual system BW, that is, whether to assign an RB for a plurality of subframes by using the single DCI (S310).

Subsequently, the serving cell may report a result of the determination to the UE 100 through a signal (S320).

Subsequently, if it is determined that the serving cell assigns the resource on the basis of the virtual system BW, that is, assigns the RB for the plurality of subframes by using the single DCI, the resource assignment field including information regarding the virtual system bandwidth is transmitted to the UE by including it to the DCI (S330).

The UE 100 monitors a plurality of candidate control channels in a search space for the serving cell (S340), decodes the plurality of candidate control channels (S350), and acquires the DCI.

Instead of the conventional resource assignment method which uses the downlink system bandwidth $N_{RB}^{DL}$, the DCI may include information regarding the virtual system BW.

Thereafter, without additional transmission of the DCI including the resource block assignment field, the serving cell transmits a data channel on a plurality of subframes to the UE 100 via a PDSCH (S360). Accordingly, the UE 100 can receive the data channel on the plurality of subframes even if there is no additional reception of the DCI including the resource block assignment field.

<Second Disclosure of the Present Specification>

As briefly introduced above, according to the second disclosure of the present specification, a transmission power control (TPC) field in DCI is provided properly to a small cell. This will be described below in detail.

In a situation where a small cell is deployed with a high density in a geographical sense, a coverage size of the small cell may be small, and at the same time, the number of UEs simultaneously accessible may also be small. Further, it can be expected that a situation where UEs accessing to one small cell are close in a geographical location in general, and in this case, it can be said that a correlation of a channel situation is also high. Furthermore, a movement speed of the UE may be almost zero or may be significantly low.

Therefore, it can be expected a situation where transmission power has low sensitivity according to a time and also according to a UE. In this case, it may be ineffective that a TPC field is always included in each DCI.

Therefore, according to the second disclosure of the present specification, the TPC field may be transmitted periodically or non-periodically in a format specific to power control similarly to a DCI format 3/3A, and the DCI format for scheduling a physical channel such as a PUSCH, a PDSCH, a PRACH, etc., may not include the TPC field.

Whether the DCI format includes or excludes the TPC field may be reported to the UE through a higher layer signal. A case where the small cell excludes the TPC field from the DCI format is when a physical channel scheduled through the DCI format is received to the small cell itself. This is to utilize the TPC field as ARI when a PUCCH format 3 is transmitted not to the small cell but to another cell.

<Third Disclosure of the Present Specification>

As briefly introduced above, according to the third disclosure of the present specification, an MCS field in DCI is provided properly to a small cell. This will be described below in detail.

In a situation where a small cell is deployed with a high density in a geographical sense, a coverage size of the small cell may be small, and it can be expected a situation where a channel state experienced by a UE is a good (for example, a situation where an SINR value is higher than a specific threshold). Therefore, in this case, a low-level MCS may be used significantly less frequently.

Therefore, according to the third disclosure of the present specification, the MCS field in the DCI may be simplified in case of a small cell having a propose of improving a transfer rate. In this case, whether the small cell has the purpose of improving the transfer rate may be reported to the UE through the higher layer signal. Alternatively, when the small cell is detected through, for example, a discovery signal, the UE may be allowed to know whether the cell has the purpose of improving the transfer rate through the discovery signal. As an example of MCS simplification, the entirety or part of MCS corresponding to QPSK may be allowed not to be used, and thus the number of unnecessary or ineffective bits of the MCS field may be decreased. A UE in a situation where a low-level MCS can be requested may be restricted to access a corresponding small cell (i.e., a cell not supporting the low-level MCS).

It may be considered to employ 256QAM in the small cell as a way of further increasing spectrum efficiency, and a process of removing or omitting the MCS level may be helpful to ensure a bit required to modify or add DCI for supporting the 256QAM.

The aforementioned embodiments of the present invention can be implemented through various means. For example, the embodiments of the present invention can be implemented in hardware, firmware, software, combination of them, etc. Details thereof will be described with reference to the drawing.

Figure 15:
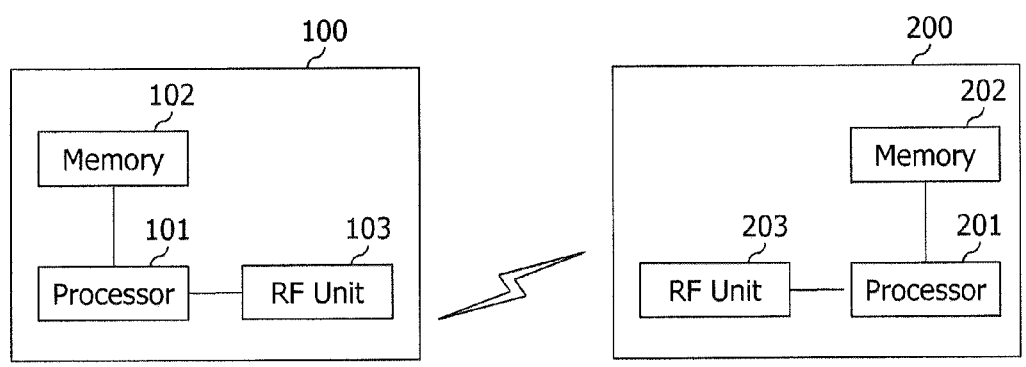
FIG. 15 is a block diagram showing a wireless communication system according to a disclosure of the present specification.

FIG. 15 is a block diagram showing a wireless communication system according to a disclosure of the present specification.

A BS 200 includes a processor 201, a memory 202, and a radio frequency (RF) unit 203. The memory 202 coupled to the processor 201 stores a variety of information for driving the processor 201. The RF unit 203 coupled to the processor 201 transmits and/or receives a radio signal. The processor 201 implements the proposed functions, procedures, and/or methods. In the aforementioned embodiment, an operation of the BS may be implemented by the processor 201.

A UE 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of receiving a data channel from a cell, the method comprising:
    monitoring, by a user device, a plurality of candidate control channels within a search space of the cell;
    acquiring, by the user device, one (1) downlink control information (DCI) by decoding the plurality of candidate control channels,
    wherein the one DCI is used to allocate a set of resource blocks (RBs) for a plurality of subframes,
    wherein the one DCI includes an RB assignment field and information on the plurality of subframes in which the data channel is transmitted, and
    wherein the set of RBs in the plurality of subframes through which the data channel is transmitted is allocated at once by the one DCI; and
    receiving, by the user device from the cell, the data channel through the plurality of subframes allocated using the one DCI.

2. The method of claim 1, wherein the RB assignment field further includes RB group (RBG) size information based on a virtual system bandwidth.

3. The method of claim 1, further comprising receiving, from the cell, information regarding whether to assign a resource based on a virtual system bandwidth instead of on a downlink system bandwidth.

4. The method of claim 1,
    wherein the one DCI including the RB assignment field does not include a transmission power control (TPC) command field, and
    wherein the TPC command field is received through a different DCI.

5. The method of claim 4, wherein the different DCI uses a DCI format 3 or a DCI format 3A.

6. A user device for receiving a data channel from a cell, the user device comprising:
    a transceiver configured to monitor a plurality of candidate control channels within a search space of the cell; and
    a processor with a memory, the processor configured to acquire one (1) downlink control information (DCI) by decoding the plurality of candidate control channels,
    wherein the one DCI is used to allocate a set of resource blocks (RBs) for a plurality of subframes,
    wherein the one DCI includes an RB assignment field and information on the plurality of subframes in which the data channel is transmitted,
    wherein the set of RBs in the plurality of subframes through which the data channel is transmitted is allocated at once by the one DCI, and
    wherein the processor receives, via the transceiver, the data channel through the plurality of subframes allocated using the one DCI.

7. The user device of claim 6, wherein the RB assignment field further includes RB group (RBG) size information based on a virtual system bandwidth.

8. The user device of claim 6, wherein the transceiver further receives, from the cell, information regarding whether to assign a resource based on a virtual system bandwidth instead of on a downlink system bandwidth.

9. The user device of claim 6,
    wherein the one DCI including the RB assignment field does not include a transmission power control (TPC) command field, and
    wherein the TPC command field is received through a different DCI.

* * * * *